June 16, 1942.  M. N. FARR  2,286,479
AIR FILTER PANEL
Original Filed July 22, 1939
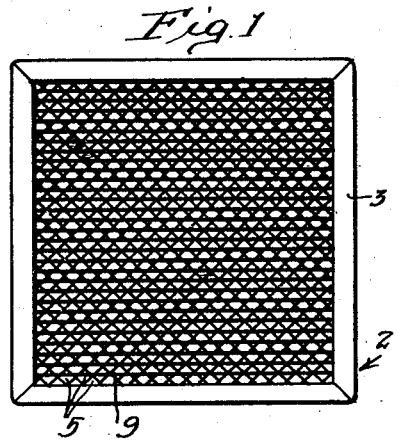
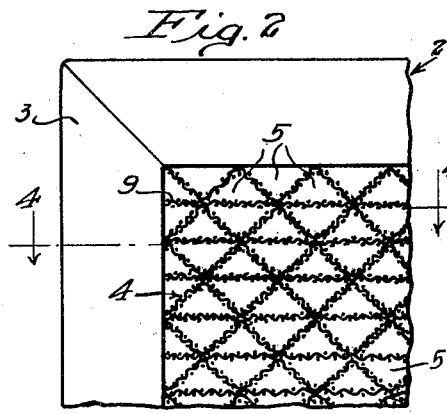
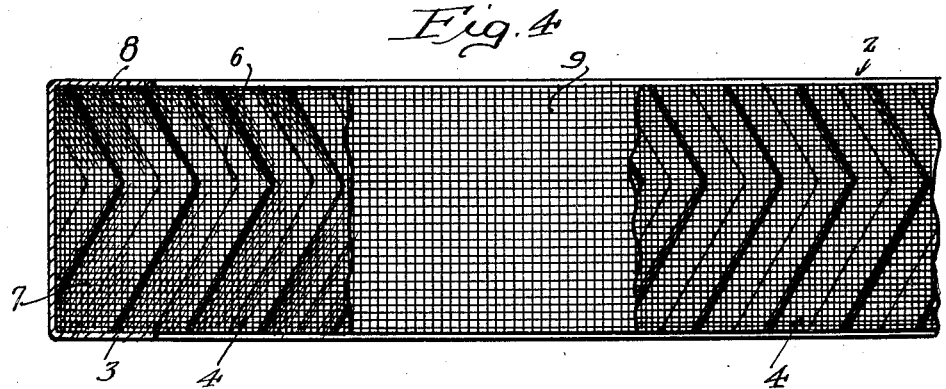
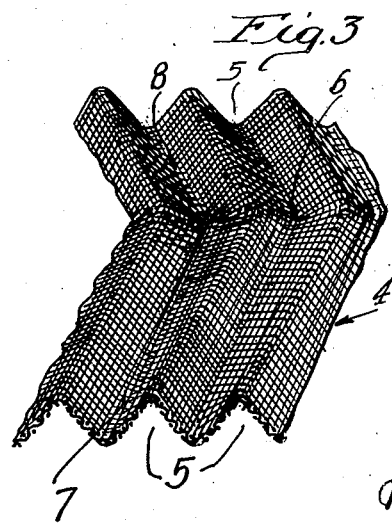
Inventor
Morrill N. Farr
By Lyon & Lyon
Attorneys Patented June 16, 1942

2,286,479

UNITED STATES PATENT OFFICE 2,286,479

AIR FILTER PANEL

Morrill N. Farr, Los Angeles, Calif.

Continuation of application Serial No. 285,904, July 22, 1939. This application April 4, 1940, Serial No. 327,833

8 Claims. (Cl. 183—69)

This invention relates to an air filter of the type employed for filtering air from dust by the swirling, baffling, impingement principle.

This application is a continuation of my application, Serial No. 285,904, filed July 22, 1939.

It is a general object of the present invention to provide an air filter panel designed to at one time possess a high cleaning efficiency while exhibiting a low pressure drop, which low pressure drop increases only slowly with the increased dust load in the filter.

Heretofore, in the construction of air filter panels, various maizes of alternately placed crimped wire screens have been employed through which the air to be filtered is forced and in which the dust carried by the air is intended to be removed by the swirling impingement action of the air passing through such filter panel. The filter panels heretofore employed have generally afforded appreciable pressure drop to the air being filtered, which pressure drop rapidly increases as the dust load within the filter panel increases. I have discovered that this high pressure drop in the filters previously used has been due to the arrangement in such filter panels of the maize of screens employed in such positions that the air flow is compelled to take place through the screens. I have further discovered that it is unnecessary in an air filter panel to force the flow of air through the screens employed in the panel in order to secure the desired cleaning efficiency. On the contrary, I have found that by arranging the screens in the filter panel in such a manner as to provide paths for air flow through the filter panel, along lines parallel to the plane or planes of the screens employed, high filtering efficiency can be effected while at the same time there is obtained a lower pressure drop less affected by increased dust load.

Thus, in the air filter panel of the present invention there is provided a maize of air passages through the panel arranged to change the direction of the flowing air but constructed to allow the air to flow by the wire screens employed rather than through the same. It is found that with the screen of the present invention sufficient swirling and impinging action takes place to insure efficient cleaning of the air, while since the air is not necessarily forced through the screens a much lower pressure drop arises, which pressure drop does not increase as rapidly as in the case of the air filter panels heretofore in general use.

Further objects and advantages of the present invention will be apparent from a description of a preferred form or example of an air filter panel embodying the present invention. I have hereafter described, with reference to the accompanying drawing, a preferred form or example of an air filter panel embodying the present invention.

In the drawing:

Figure 1 is an elevation of an air filter panel embodying the invention.

Figure 2 is an enlarged fragmentary elevation.

Figure 3 is a fragmentary perspective view of one of the screens employed.

Figure 4 is a fragmentary section on the line 4—4 of Figure 2.

Referring to the drawing, the filter comprises a rectangular frame 2 having flange portions 3 adapted to form a channel-like frame for receiving and enclosing the ends of the screening elements of the filter. The filter proper is formed of screen wire of any usual or preferred mesh. Certain of the screen wire members 4 of the filter panel are crimped or corrugated, as indicated in Figure 3, to provide in cooperation with adjacent screen members air passages 5 leading from the front to the rear of the air panel, whereby the air panel is provided with passages for air therethrough independent of the movement of the air through the mesh of the screens forming the members 4. The screen members 4 are so crimped that the resulting air passages 5 are at angles to lines normal to the face of the filter panel so as to cause the air flowing through such passages to change in direction and impinge to an extent at least against the wire mesh forming the members 4 whereby to better insure the deposit of dust from said air. In addition thereto, said air passages are indicated as changing in direction, as indicated at 6, which change in direction is preferably somewhat abrupt to provide further assurance that the air flowing through the panels will have its dust particles thoroughly impinged against the screen wire of the members 4 and thereby deposit the dust load.

While various shapes may, if desired, be given to the passages formed by the crimps of the members 4, most satisfactory results have been secured when the members 4 are corrugated in the herring-bone shape illustrated, in which the first or entrance portions 7 of the passages extend diagonally in one direction relative to lines normal to the plane of the filter and then abruptly change in direction, and the second or exit portions 8 of the passages extend at opposite diagonals to lines normal to the plane of the filter. The entrance portions 7 of the air passages are made of somewhat greater length than the exit portions 8. With such a design of filter it is found that the major loading of the filter with air takes place along the entrance portions 7 of the passage.

The filter panel is also indicated as including the flat or uncrimped screening members 9 positioned between the crimped filter members 4, which members 9 serve both to define more restricted passages for the flow of air and also to better retain the filter members 4 in their desired positions. The flat screens 9 also aid in the filtering action, providing surfaces for collection of air by impingement action.

By means of the air panel in the present invention, it will be seen that there are provided passages for flow of air through the maize of screen wire filter members, such as by the flow of air through one of the entrance passages 7 and out of the connecting exit passage 8 without the air being forced to pass through the mesh of the wire forming the filter members themselves. It is to be understood, of course, that certain portions of the air will flow through the mesh of the screens into adjoining passages, but as the mesh of the filter members becomes progressively loaded with dirt the flow of air becomes more and more confined to the flow through the entrance and exit passages. The resulting effect is that with the air filter panel of the present invention the pressure drop imposed by the air filter panel on the column of moving air remains more nearly constant throughout operation. Furthermore, it is found that the air filter panel retains its ability to filter air until heavily loaded with dust.

The explanation of the ability of the filter of the present invention to provide its improved filtering efficiency without substantial alteration in its static drop as it becomes loaded with dust is as follows:

The filter of the present invention is of a type in which the particles to be filtered from the air, i. e., dust, are considerably smaller than the openings of the passages through which the air is to be passed. The removal of the dust particles from air is brought about by bringing the dust particles in contact with the surface of the filter, so that such surface can catch or hold the particles (for this purpose, as is usual, the wire surface of the filter may be oiled). In order for the particles of dust to be removed from the air, they must be brought into actual contact with the collecting surface. As dust-laden air is caused to pass through an opening in a collecting surface, the dust is collected around the entrance of said opening. The collection of dust, however, is to a very large extent confined to the entrance of the opening, and, if the opening is one forming a long passage for the air, the remainder of the passage provides very little additional dust-collecting properties. The collection of dust is almost confined to the rim of the opening, and the remaining surfaces of the passage formed act to collect dust only to a very minor degree—any deposit of dust on the sides of the passage being brought into actual contact with the surfaces of the passage through turbulence of the flowing air. Thus, were it not for the foraminous character of the walls of passages 7 and 8 in the screen of applicant's invention, almost the total collection of dust would be around the entrance of the passage 7. Some slight additional collection of dust would be attained at the turning point of the passage or between entrance and exit passages 7 and 8, but the remaining walls of the passage would (were it not for the foraminous character of such walls) collect substantially no dust. Furthermore, after the coating of the surface of the passage at its entrance with dust to a point where further dust can not be brought into contact with the surface, substantially no further dust would be collected by the filter. By the construction shown, however, where the walls forming the passages 7 and 8 are foraminous in character, each opening in said walls acts itself for efficient collection of dust. When a clean filter is first placed in use it is found that the dust collects around the apertures of the screen at the entrance point to the passage 7, and initially the subsequent openings in the screen forming the walls of the passages 7 and 8 collect little dust. This indicates that the air entering the passage 7 is almost immediately broken up into fine streams of air flowing through the screening openings of the wire forming the passage. As the filter becomes progressively loaded with dust, the air travels successively further down the passage 7 before flowing through the openings in the screen forming the passage, and subsequent portions of the wire screen thereupon start the major action in collecting the dust from the air. This action continues, without substantial increase of the static pressure or resistance to the flow of the air, until all portions of the screen forming the walls of the passage 7 have become thoroughly coated with dust. The abrupt turn in the passage provided between the entrance and exit portions 7 and 8 affords two important functions in the operation of the screen. One function of such bend is that it imposes some pressure drop to the flow of air directly through the passage 7, effective for forcing the air through the openings of the screen forming the passage. This function is important because the filtering efficiency of the filter is dependent upon the fact, to a large extent, that the air rather than flowing in a stream through the passages 7 and 8 is caused, in fact, to flow through the walls of such passages and the screening openings there provided. The second function of the bend in the passage is that it affords what may be termed a secondary filter section effective for a final cleaning of dust from the air, which dust is not removed in the walls forming the entrance passage 7. Furthermore, as the filter becomes progressively loaded with air the screening openings forming the walls of the entrance passage 7 may become bridged with dust and occasionally this dust bridging may be caused to break out, in which case the dust so carried from the walls of the entrance passage 7 will be collected by the walls of the exit passage 8.

From the foregoing explanation of the action of the screen of the present invention, it can be seen that I have provided an air filter panel which operates in a new and novel manner, in that as the filter is progressively loaded with dust from the entrance point towards the exit the flow of air through the filter panel is not plugged, but, on the other hand, merely progressively changes its direction, passing mainly through different screening openings, maintaining the original filtering efficiency of the panel without substantial alteration of the pressure drop.

While the particular form of air filter panel herein described is well adapted to carry out the objects of the present invention, it is to be understood that various modifications may be made without departing from the principles of the invention, and the present invention is not limited to the specific form shown but includes all such variations and modifications as come within the scope of the appended claims.

I claim:

1. An air filtering panel, which comprises layers of alternate crimped and uncrimped mesh members packed together, the crimps of said crimped mesh members spacing the mesh members apart and subdividing the panel into a multiplicity of passages extending through the panel, the crimps changing in direction to cause the said passages to change in direction.

2. An air filtering panel, which comprises layers of alternate crimped and uncrimped mesh members packed together, the mesh members extending through the panel with the crimped mesh members each being in one piece and having angles in the crimps, the panel thereby being subdivided into a multiplicity of passages extending through the panel, said passages changing in direction.

3. A filtering panel operating on the principle of impingement of particles on collecting surfaces, which includes alternate crimped and flat mesh screening members packed one against the other and extending in the general direction of the flow of the medium to be filtered, the crimps of the crimped screening members changing in direction and serving to subdivide the panel into a multiplicity of passages extending through the panel, the walls of which passages are formed by said mesh members, whereby the medium may flow through the mesh of said members near the entrance of the panel when the filter is clean and partially through said passages and thence through the mesh of the members at positions progressively towards the exit of the panel as the filter becomes progressively loaded with particles.

4. A filtering panel operating on the principle of impingement of particles on collecting surfaces, which includes a plurality of mesh screening members extending in the general direction of the intended flow of the medium to be filtered, said members being constructed and arranged so as to effect a multiple subdivision of the panel in both dimensions perpendicular to the general direction of flow of the medium to be filtered, thereby forming passages extending through said filter, the walls of which passages are composed of such mesh members, said passages changing direction, whereby the medium may flow through the mesh of said members near the entrance of the panel when the filter is clean and partially through said passages and thence through the mesh of the members located progressively towards the exit of the panel as the panel becomes progressively loaded with particles.

5. A filtering panel operating on the principle of impingement of particles on collecting surfaces, which includes a plurality of sheets of crimped mesh screening members positioned with the sheets extending in the general direction of the intended flow through the panel of the medium to be filtered, the crimp of said sheets being constructed and arranged to effect a multiple subdivision of the panel in both dimensions perpendicular to the general direction of flow of the medium to be filtered, thereby forming passages the walls of which are composed of such mesh members, which passages extend through said panel and a portion of each of said passages being disposed angularly with respect to a remaining portion of the passages.

6. A filtering panel operating on the principle of impingement of particles on collecting surfaces, which includes alternate crimped and flat mesh screening members packed one against the other and extending in the general direction of the intended flow of the medium to be filtered so as to effect a multiple subdivision of the panel in both dimensions perpendicular to the general direction of the flow of the medium to be filtered, thereby forming a multiplicity of adjoining passages of approximately the same cross-sectional dimensions extending through said panel, the walls of which passages are formed by said mesh members.

7. An air filtering panel operating on the principle of impingement of particles on a collecting surface, which panel includes mesh screening members constructed and arranged to form passages extending through the panel of relatively large size as compared with the openings in said mesh members, said passages subdividing the panel in both dimensions perpendicular to the general direction of flow of the medium to be filtered and being so constructed and arranged that as the mesh of the members becomes progressively clogged the medium to be filtered may flow through such passages and encounter unclogged openings in said mesh members, said passages changing in direction.

8. An air filtering panel operating on the principle of impingement of particles on a collecting surface, which panel includes mesh screening members constructed and arranged to form passages extending through the panel of relatively large size as compared with the openings in said mesh members, said passages subdividing the panel in both dimensions perpendicular to the general direction of flow of the medium to be filtered and being so constructed and arranged that as the mesh of the members becomes progressively clogged the medium to be filtered may flow through such passages and encounter unclogged openings in said mesh members, said passages changing abruptly in direction.

MORRILL N. FARR.